United States Patent
Skurnik

(10) Patent No.: US 7,454,967 B2
(45) Date of Patent: Nov. 25, 2008

(54) SIGNAL CONDITIONING METHODS AND CIRCUITS FOR A CAPACITIVE SENSING INTEGRATED TIRE PRESSURE SENSOR

(75) Inventor: David Skurnik, Kirkland, WA (US)

(73) Assignee: LV Sensors, Inc., Emeryville, CA (US)

( * ) Notice: Subject to any disclaimer, the term of this patent is extended or adjusted under 35 U.S.C. 154(b) by 0 days.

(21) Appl. No.: 11/825,883

(22) Filed: Jul. 9, 2007

(65) Prior Publication Data
US 2008/0022762 A1   Jan. 31, 2008

Related U.S. Application Data

(60) Provisional application No. 60/819,824, filed on Jul. 10, 2006.

(51) Int. Cl.
*B60C 23/02* (2006.01)
*H03M 1/12* (2006.01)
(52) U.S. Cl. .................. 73/146.5; 73/146; 341/144; 341/155; 341/172
(58) Field of Classification Search ........ 73/146–146.8; 341/126–173
See application file for complete search history.

(56) References Cited

U.S. PATENT DOCUMENTS

| | | | |
|---|---|---|---|
| 4,648,274 A | 3/1987 | Trainer | |
| 5,028,876 A | 7/1991 | Cadwell | |
| 5,563,597 A * | 10/1996 | McCartney | 341/150 |
| 6,040,793 A * | 3/2000 | Ferguson et al. | 341/143 |
| 6,441,762 B2 * | 8/2002 | Angelici et al. | 341/150 |
| 6,570,519 B1 * | 5/2003 | Yang | 341/143 |
| 6,621,438 B1 * | 9/2003 | Hong | 341/144 |
| 6,744,394 B2 * | 6/2004 | Liu et al. | 341/155 |
| 6,970,340 B2 | 11/2005 | Nakayama | |
| 7,002,455 B2 | 2/2006 | Buck et al. | |
| 7,068,198 B2 | 6/2006 | Hong et al. | |
| 7,071,780 B2 | 7/2006 | Van Zanten | |
| 7,155,979 B2 | 1/2007 | Lasalandra et al. | |
| 2005/0257597 A1 | 11/2005 | Condemine et al. | |
| 2007/0029629 A1 | 2/2007 | Yazdi | |

* cited by examiner

Primary Examiner—Edward Lefkowitz
Assistant Examiner—Jermaine Jenkins
(74) Attorney, Agent, or Firm—Lumen Patent Firm

(57) ABSTRACT

A tire pressure monitoring system is provided that includes a switched capacitor circuit having a clock with two non-overlapping clock phases that control a state of analog switches of the switched capacitor circuit. The system uses tire pressure sensor MEMS capacitors that are measured differentially. A capacitance-to-voltage converter is connected to the MEMS sense capacitor, and a sigma-delta converter having a comparator with a first digital output state and a second digital output state is used. The first output state is a sum of reference voltages and the second output state is a difference of the reference voltages. An average value of the capacitance-to-voltage converter output is driven to a zero value and a digital output is provided of the average output states that is equal to a difference between the MEMS capacitors divided by their sum multiplied by a ratio of the reference voltages.

9 Claims, 11 Drawing Sheets

SIGNAL CONDITIONING METHODS AND CIRCUITS FOR A CAPACITIVE SENSING INTEGRATED TIRE PRESSURE SENSOR

CROSS-REFERENCE TO RELATED APPLICATIONS

This application is cross-referenced to and claims the benefit from U.S. Provisional Patent Application 60/819,824 filed Jul. 10, 2006, which is hereby incorporated by reference.

FIELD OF THE INVENTION

The invention relates generally to electronic circuits. More particularly, the invention relates to electronic circuits for signal conditioning and power management of differential-capacitive sensors for integrated tire pressure sensors.

BACKGROUND

A capacitive pressure sensor, or capacitive accelerometer, conveys the state of the pressure measurement by varying the magnitude of its capacitance. An electronic circuit must be used to measure this changing capacitance. Typically, the magnitude of the capacitance change is very small, while the required resolution is quite high, often as high as 16-bits (one part in 65,535). The capacitive sensor is often accompanied by large, unwanted parasitic load capacitors. These parasitic capacitors can easily inundate the sensor capacitors, resulting in attenuation of the measured signal. Further, in the case of a battery-powered tire pressure measurement system, very low circuit power consumption is required. It is desirable for the signal output function to be independent of any specific circuit parameter such as the value of a resistor, circuit capacitor, clock frequency, or voltage. Accordingly, there is a need in the art to develop differential-capacitance tire pressure measurement circuits that minimize parasitic capacitances, require low power consumption, and generate a signal output that is independent of any specific circuit parameter.

SUMMARY OF THE INVENTION

The current invention provides a tire pressure monitoring system that includes a switched capacitor circuit having a clock with two non-overlapping clock phases that control a state of analog switches of the switched capacitor circuit. The phases include phase I and phase II, where the switched capacitor circuit operates according to the frequencies of the clock. The tire pressure monitoring system uses tire pressure sensor MEMS capacitors, where the MEMS capacitors have at least one pair of sense capacitors that are measured differentially. The system uses a capacitance-to-voltage converter connected to the MEMS sense capacitor, and a sigma-delta converter having a comparator with a first digital output state and a second digital output state. The first output state is a sum of reference voltages and the second output state is a difference of the reference voltages. When in the first output state, a first capacitor of the MEMS is charged to the first output state on phase II and a second capacitor of the MEMS is charged to the second output state on phase I. When in the second output state, the first capacitor is charge to the second output state on phase II and the second capacitor is charged to the first output state on phase I, where an average of the output states is determined and provided to the capacitance-to-voltage converter. An average value of the capacitance-to-voltage converter output is driven to a zero value and a digital output is provided of the average output states that is equal to a difference between the MEMS capacitors divided by their sum multiplied by a ratio of the reference voltages.

In one aspect of the invention, the MEMS capacitor pair is a three-terminal MEMS capacitor pair, where a first terminal is a driven terminal of a first capacitor of the pair, and a second terminal is a driven terminal of a second capacitor of the pair, while a third terminal is common sense terminal node from the pair that is connected to an input of the capacitance-to-voltage converter.

In another aspect of the invention, the MEMS capacitors pair has a three-terminal MEMS capacitor pair. Here, a first terminal is a driven common terminal to the pair and a second terminal is a sense terminal from a first capacitor of the pair and a third terminal is a sense terminal from a second capacitor of the pair, where the sense terminals are connected to an input of the capacitance-to-voltage converter. In a further aspect, the switched capacitor circuit further has double-frequency sampling clocks that sample the sense capacitors at a frequency that is twice an operating frequency of the sigma-delta converter, where the sigma-delta converter is a fully differential sigma-delta converter.

According to one aspect of the invention, the MEMS capacitors pair is a four-terminal MEMS capacitor pair, where a first terminal is a driven terminal of a first capacitor of the pair and a second terminal is a driven terminal of a second capacitor of the pair and a third terminal is a sense terminal from the first capacitor of the capacitor pair and a fourth terminal is a sense terminal from the second capacitor of the capacitor pair. Here, the sense terminals are connected directly to the sigma-delta converter and the capacitance-to-voltage converter is removed from the circuit. In another aspect, the switched capacitor circuit further has an input common mode correction amplifier connected to the sense terminals and to an input of the sigma-delta converter.

In one aspect, the tire pressure monitoring system has a switched capacitor circuit, where the switched capacitor circuit has a clock with two non-overlapping clock phases that control a state of analog switches of the switched capacitor circuit. The phases include phase I and phase II, where the switched capacitor circuit operates at frequencies according to the clock. The system further includes MEMS capacitors having at least one pair of sense capacitors that is measured differentially, an analog to digital converter, a multiplexer having a plurality of multiplexer inputs and outputs, where a portion of the multiplexer inputs are connected to sense terminals of the MEMS capacitors. Additionally, the system includes a pair of test capacitors connected in parallel with the MEMS capacitors to the multiplexer inputs, a difference amplifier having inputs connected to outputs of the multiplexer, where the outputs of the differential amplifier are connected to inputs of the analog to digital converter. A common mode correction amplifier is connected to the multiplexer outputs, and the multiplexer outputs are connected to the difference amplifier input. A sum amplifier input terminal is connected to an output of the multiplexer and an output terminal of the sum amplifier is connected to a reference input of the analog to digital converter. In one aspect of the tire pressure monitoring system the common mode correction amplifier further has a pre-charge supplied to coupling capacitors of the correction amplifier. In another aspect, the common mode correction amplifier is replaced with a common mode correction integrator having a pair of sampling capacitors configured to sample and hold error signals, where the error signals are integrated to the common mode integrator on a subsequent clock cycle to reduce the error.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
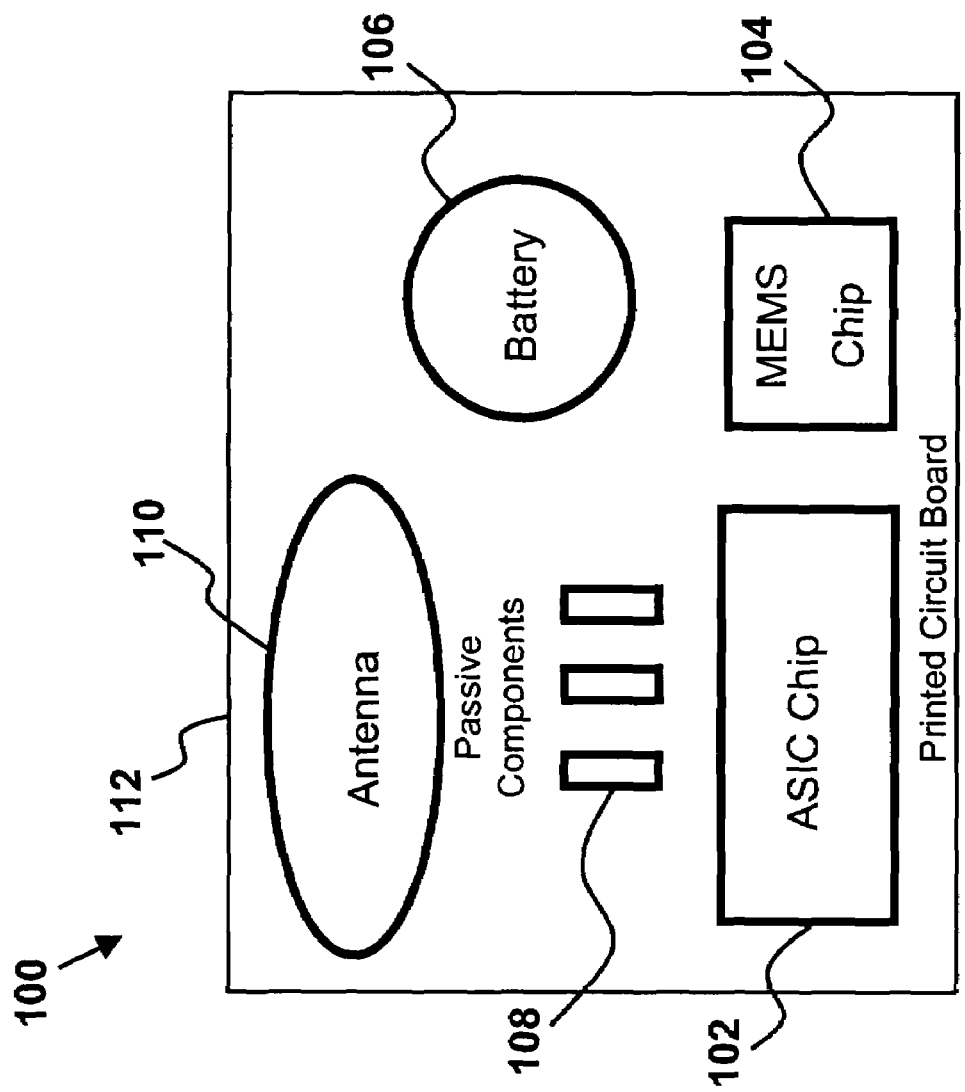
FIG. 1 shows a TPMS block diagram according to the present invention.

The present invention provides devices and methods for measuring the differential capacitance of MEMS capacitors that minimizes the effects of parasitic capacitance, obtains a high signal to noise ratio, uses low power, and occupies a small chip area of a very highly integrated Tire Pressure Monitoring System (TPMS). According to the current invention shown in FIG. 1, the TPMS 100 contains only a single Application Specific Integrated Circuit (ASIC) 102, a Micro Electro Mechanical System (MEMS) chip 104 for sensing pressure and acceleration, a battery 106, various passive components 108 such as resistors and capacitors, an antenna 110, and a printed circuit board 112 for mounting all the components.

Figure 2:
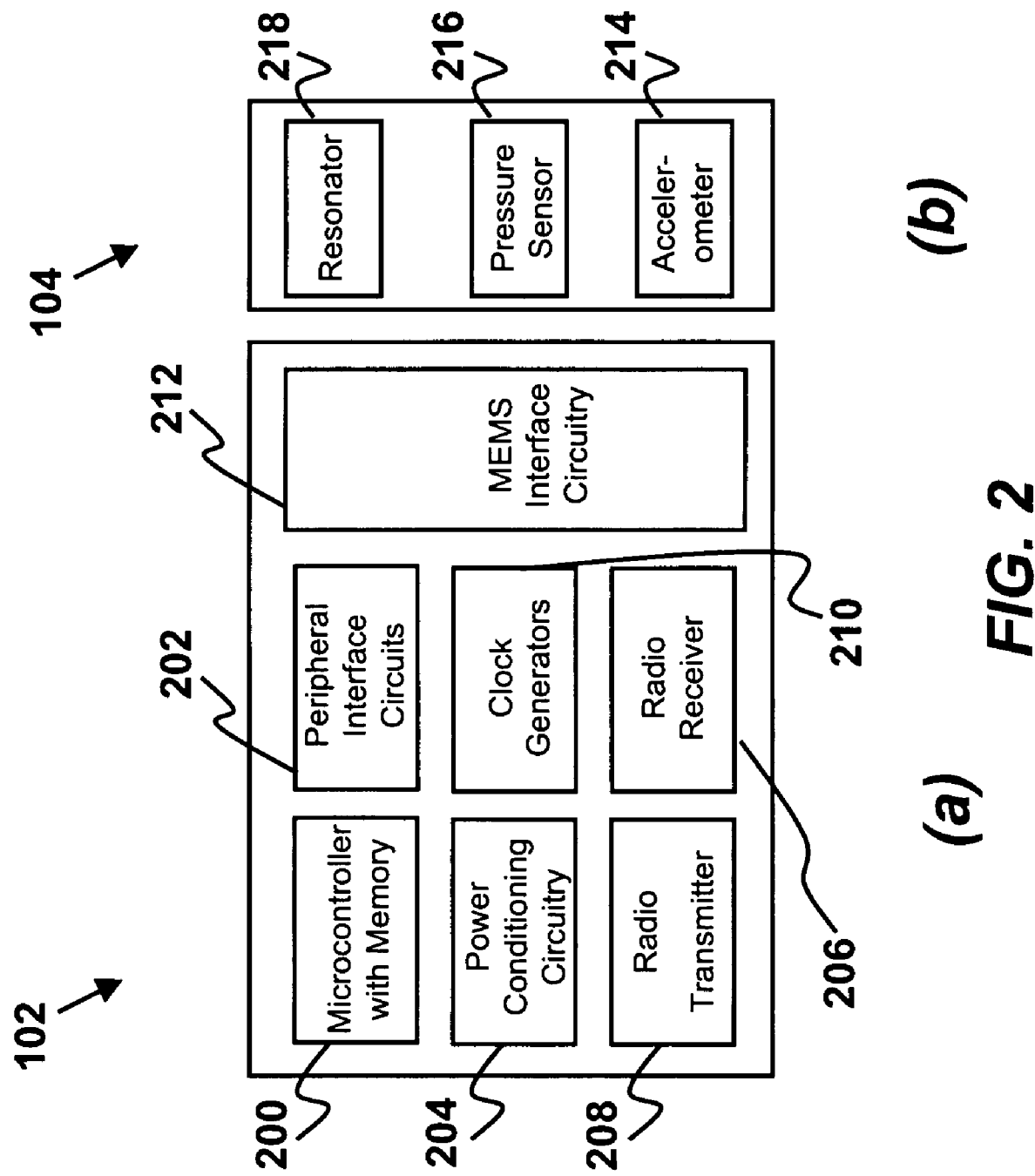
FIGS. 2(a)-2(b) show an ASIC chip and a MEMS chip according to the present invention.

The ASIC chip 102 shown in FIG. 2(a) contains all of the active subsystems required for operation. Some examples of the subsystems included on the ASIC 102 are the microcontroller 200 with its memory, peripheral interface circuits 202, power conditioning circuits 204 such as voltage regulators and voltage detectors, a radio receiver 206, a radio transmitter 208, clock generators 210 including a watchdog timer, and a block of MEMS interface circuitry 212 that is used to interface to the MEMS chip 104. FIG. 2(b) shows the MEMS chip 104 containing a multi-axis accelerometer 214, a pressure sensor 216, and a resonator 218.

Figure 3:
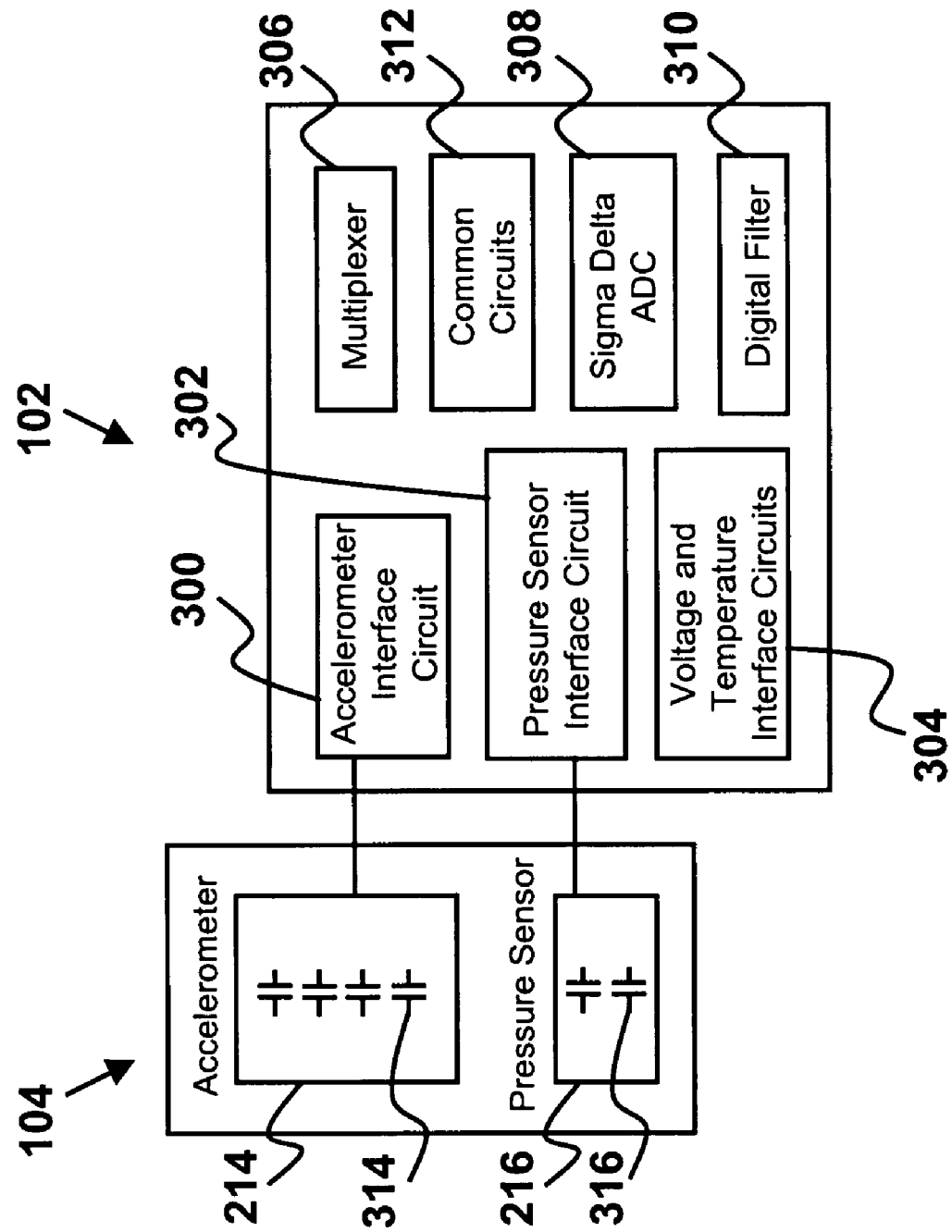
FIG. 3 shows MEMS interface circuitry according to the present invention.

FIG. 3 shows the ASIC chip 102 further including MEMS Interface Circuitry including an Accelerometer Interface Circuit 300, a Pressure Sensor Interface Circuit 302, Voltage and Temperature Interface Circuitry 304, a Multiplexer 306, a Sigma Delta ADC 308, a Digital filter 310, and a block of common circuits 312 that serve support functions for the other blocks. The MEMS chip 104 contains four acceleration sense capacitors 314 for the dual axis accelerometer 214 and two pressure sense capacitors 316 for the pressure sensor 216. The MEMS resonator 218 is not shown.

The MEMS Interface Circuitry (300, 302) must perform the following functions: determine the acceleration in two axes by measuring the differential capacitance between two pairs of acceleration sense capacitors 314; determine the pressure by measuring the differential capacitance between a pair of pressure sense capacitors 316; measure the battery voltage or regulator voltage; and measure the temperature.

In a theoretical differential-capacitor sensor circuit, the output function depends only upon the magnitude of the sensor capacitances (314, 316), a dimensionless gain factor, and perhaps a stable reference voltage. An example of a circuit sum-divided-by-difference transfer function that satisfies these requirements is:

$$Vout = Vr * G * \left(\frac{C1 - C2}{C1 + C2}\right) \qquad \text{Equation 1}$$

Where Vr is a stable reference voltage, G is a dimensionless gain factor, and C1 and C2 are the sensor capacitors (314, 316).

Figure 4:
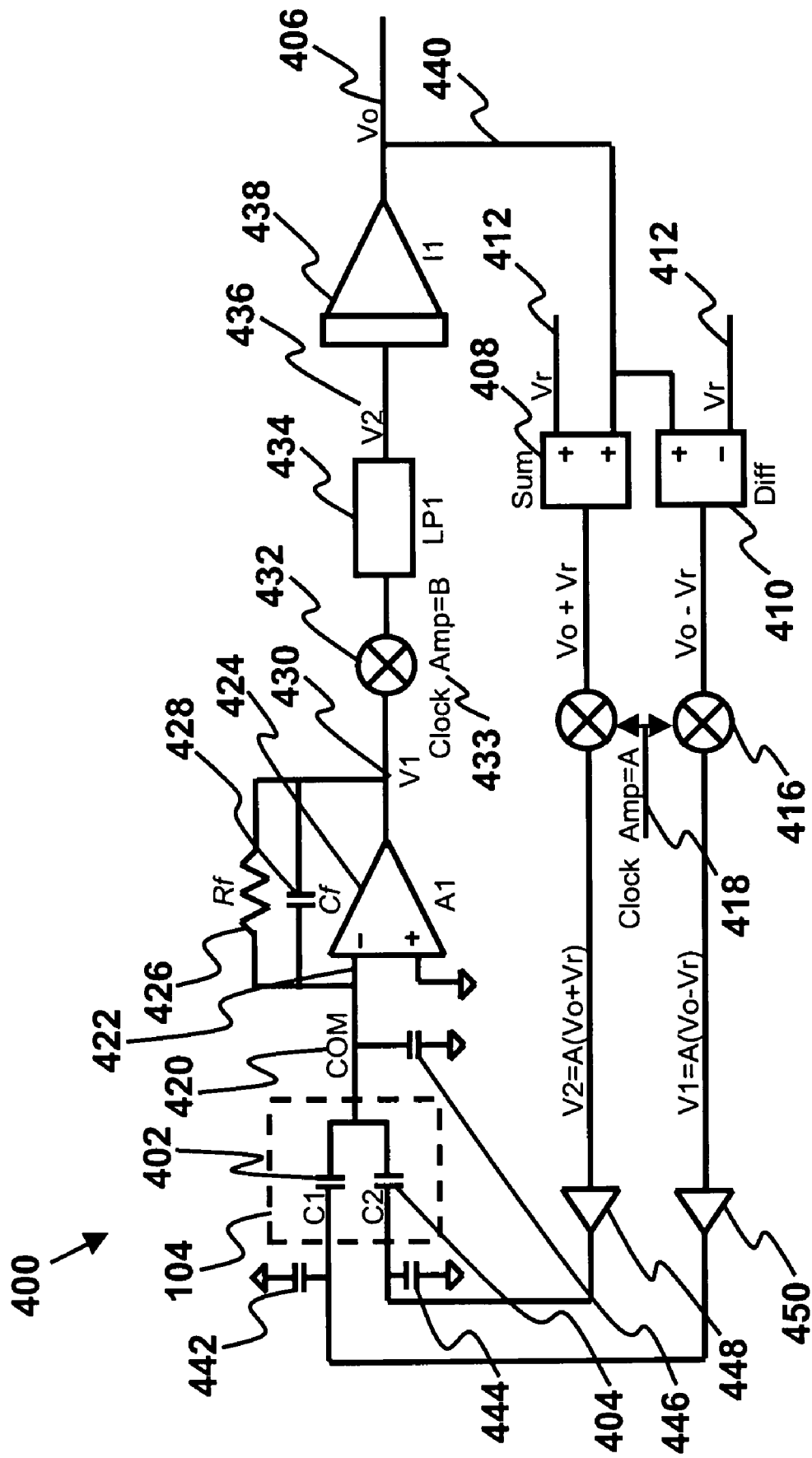
FIGS. 4-8 show circuits according to the present invention.

An analog output sum-divided-by-difference circuit 400 that produces this output function is shown in FIG. 4. In this circuit, the MEMS sensor capacitors C1 402 and C2 404, are shown as a pair. Even though there may be more than two capacitors on any specific MEMS chip, the sensor capacitors (402, 404) are generally measured differentially in pairs. The analog output sum-divided-by-difference circuit 400 of FIG. 4 is a feedback control system that produces the desired output function when it has settled. The DC output voltage, Vo 406, is applied to a sum block 408 and a difference block 410 that create the signals Vo+Vr and Vo−Vr, respectively, where Vr 412 is a stable reference voltage. These two DC voltages (406, 412) are then modulated 416, or multiplied, by an AC clock signal 418 with amplitude A. It is necessary to apply a high frequency modulated signal to the sense capacitors (314, 316) because it is not possible to pass any DC signal through a capacitor. The high frequency clock signal 418 lowers the effective impedance of the sensor 104, and increases the signal to noise ratio of the circuit 400.

The common node 420 of the sensor 104, COM, is applied to the summing junction 422 of amplifier A1 424. The feedback for amplifier A1 424 is a parallel combination of a resistor Rf 426 and capacitor Cf 428. By ensuring the clock frequency 418 is much higher than the corner frequency of the feedback circuit V1 430, the magnitude of the AC output voltage of amplifier A1 424, is:

$$Mag(V1) = -\frac{C1}{Cf}A(Vo + Vr) - \frac{C2}{Cf}A(Vo - Vr) \qquad \text{Equation 2}$$

The signal V1 is demodulated 432 to DC by multiplying it by a clock signal of amplitude B 433. The unwanted high frequency components of the demodulator output are removed in a low pass filter LP1 434. The DC output voltage V2 436 of the low pass filter 434 is given by:

$$V2 = -\frac{C1}{Cf}AB(Vo + Vr) - \frac{C2}{Cf}AB(Vo - Vr) \qquad \text{Equation 3}$$

The signal V2 436 is then applied to an integrator I1 438. The output of I1 will adjust itself by the action of integration until the feedback loop 440 is stabilized. Since an integrator has infinite gain at DC, when the loop 440 is settled, the DC input voltage V2 436 to the integrator 438, must be zero. If V2 436 in Equation 3 is set to zero then:

$$0 = -\frac{C1}{Cf}AB(Vo+Vr) - \frac{C2}{Cf}AB(Vo-Vr) \quad \text{Equation 4}$$

Equation 4 can be solved for Vo:

$$Vout = Vr\left(\frac{C2-C1}{C1+C2}\right) \quad \text{Equation 5}$$

Equation 5 is the desired sum-divided-by-difference transfer function. It can be seen that the values of the circuit elements such as the amplitude of the clock signals, A 418 and B 433, and the value of the feedback capacitor Cf 428, are all canceled. The output function depends only upon the magnitude of the sensor capacitors (402, 404), and the magnitude of a stable reference voltage 412.

The circuit of FIG. 4 is insensitive to the affect of parasitic capacitances, 440, 442, and 446. Capacitors 440 and 442 are both driven from the low impedance output of the modulator 416, which can be optionally buffered by buffers 448 and 450. Buffers 448 and 450 can be designed with sufficient drive strength to overcome the parasitic load capacitances. The third parasitic capacitance, 446, is connected to the COM node 420. The COM node 420 is connected to the summing junction 422 of an inverting amplifier 424, which is held at virtual ground by the large open loop gain of the amplifier. Consequently, the capacitor 446 is never charged or discharged, and its influence is diminished by the magnitude of the open loop gain at the frequency of operation.

The circuit 400 of FIG. 4 is well suited for many applications, but requires modification for use in an integrated circuit application. In the current configuration, the low pass filter 434 and the integrator 438 both require large time constant passive components such as resistors and capacitors. Such large value components are not typically available on an integrated circuit, so they would have to be supplied as off-chip values, consuming valuable pin resources. Most importantly, in most applications, a digital output is required from the circuit rather than an analog output. The concept introduced in FIG. 4 can be extended to directly produce a digital output using an oversampled (Sigma Delta) data converter. In this case the integration function is accomplished at the input of the converter, and the low pass filtering is realized entirely in the digital domain using a digital low pass reconstruction filter (see FIG. 5).

Figure 5:
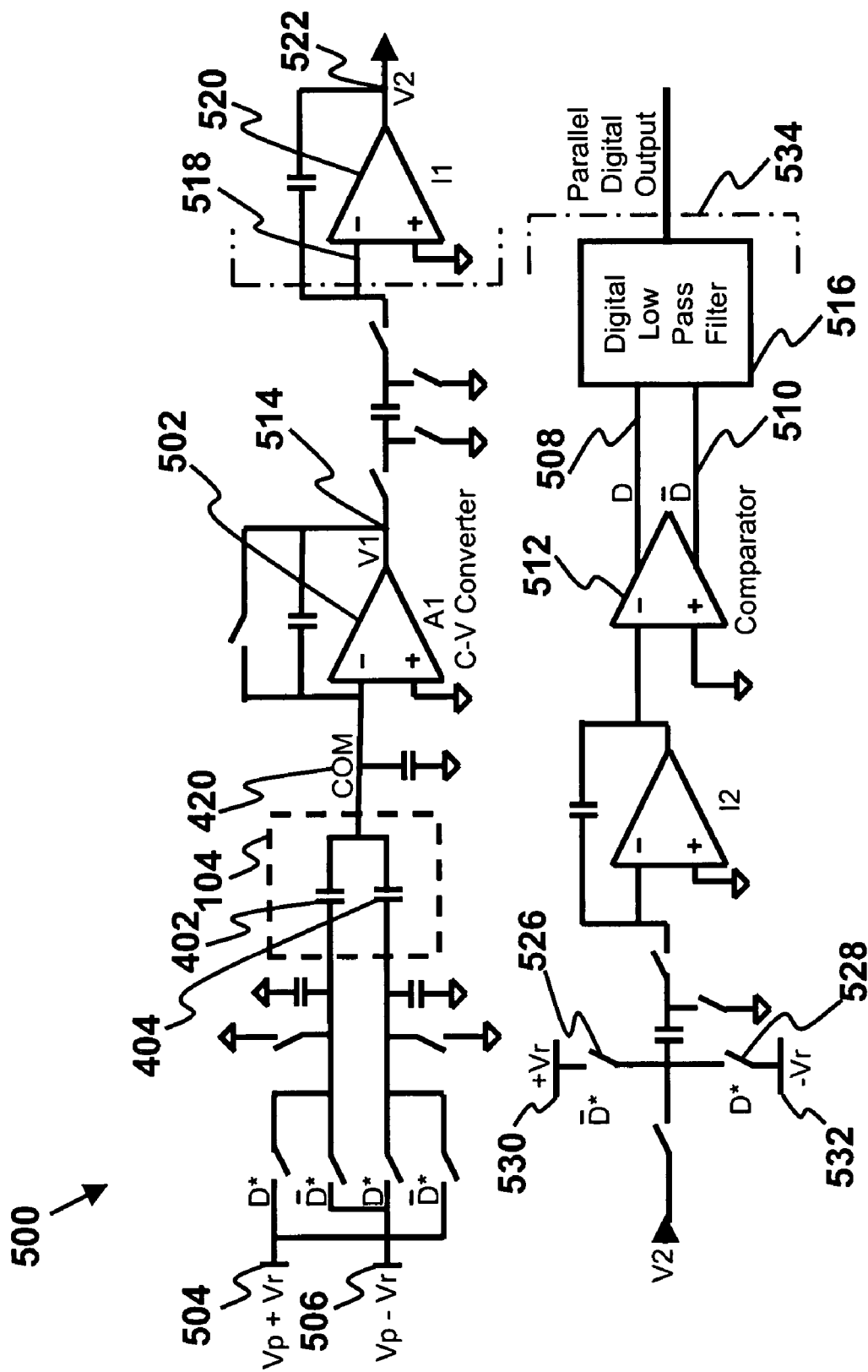

The circuit of FIG. 5 is a switched capacitor circuit 500 that operates at a defined clock frequency. The clock (not shown) is formed into two non-overlapping phases, $\Phi 1$ and $\Phi 2$. These two clock phases are used to control the state of analog switches.

The MEMS sensor 104 sense capacitors (402, 404) are connected to the input amplifier A1 502 in the same manner as in FIG. 4. Here, A1 502 is a switched capacitor amplifier that is reset on $\Phi 2$, and amplifies on $\Phi 1$. The MEMS capacitors (402, 404) are charged and discharged on opposite phases in order to amplify the difference between them, rather than the sum. C1 420 is charged to a voltage on the reset phase $\Phi 2$. That voltage can be either (Vp+Vr) 504 or (Vp−Vr) 506, where Vp and Vr are two stable reference voltages. C2 404 is reset on phase $\Phi 2$ and is charged to a voltage (Vp+Vr) 504 or (Vp−Vr) 506 on phase $\Phi 1$. For both C1 402 and C2 404, the choice between the two voltages (504, 506) is determined by D 508 and its complement D-bar 510, where D 508 and D-bar 510 are the output state of the comparator C1 512. When D 508 is true, C1 404 is charged to voltage (Vp+Vr) 504 on $\Phi 2$, and C2 404 is charged to (Vp−Vr) 506 on $\Phi 1$. When D 508 is false, the opposite occurs, and C1 402 is charged to (Vp−Vr) 506 and C2 404 is charged to (Vp+Vr) 504. At the end of the $\Phi 1$ amplification phase, the output V1 514 of amplifier A1 502 is given by:

$$V1 = -\frac{C1}{Cf}[(Vp+Vr)*D + (Vp-Vr)*\overline{D}] + \quad \text{Equation 6}$$
$$\frac{C2}{Cf}[(Vp+Vr)*\overline{D} + (Vp-Vr)*D]$$
$$= -\frac{C1}{Cf}[Vp(D+\overline{D}) + Vr(D-\overline{D})] +$$
$$\frac{C2}{Cf}[Vp(D+\overline{D}) + Vr(\overline{D}-D)]$$

In an oversampled data converter, the single bit serial output, D 508, is converted to a parallel digital output in a digital low pass filter 516. The parallel digital output code is proportional to the average, or the density of ones in the serial digital output. The mean, or average of the serial data can be found by subtracting the number of zeros from the number of ones, and then dividing by the total in order to obtain the signed average. The sum of the ones and zeros will always be equal to unity. If $D_{avg}$ is allowed to be the average of the digital output, then Equation 6 can be re-written:

$$V1 = -\frac{C1}{Cf}(Vp - D_{avg}Vr) + \frac{C2}{Cf}(Vp + D_{avg}Vr) \quad \text{Equation 7}$$

The signal V1 514 is the input 518 to integrator I1 520, and the output (V2) 522 of integrator I1 520 is further integrated in integrator I2 524. In order to maintain a stable closed loop system, the second integrator I2 524 must have localized feedback. This is implemented with the two switches (526, 528) connected to +Vr 530 and −Vr 532. Since V1 514 is the input to two series integrators (520, 524), its average output will driven to 0. Equation 7 can be written with V1=0, and then solved for $D_{avg}$:

$$0 = -\frac{C1}{Cf}(Vp - D_{avg}Vr) + \frac{C2}{Cf}(Vp + D_{avg}Vr) \quad \text{Equation 8}$$
$$D_{avg} = \frac{Vp}{Vr}\frac{(C1-C2)}{(C1+C2)}$$

The digital output of the sigma-delta converter 534 (shown within dashed brackets), $D_{avg}$, is then equal to the difference between the two capacitors (402, 404) divided by their sum, multiplied by the ratio of two stable voltage references Vp and Vr. The circuit is insensitive to parasitic capacitance in a similar manner of the circuit shown in FIG. 4.

The circuit of FIG. 5 employs a single ended design for the Sigma Delta Modulator, but a fully differential design can be used as well.

Figure 6:
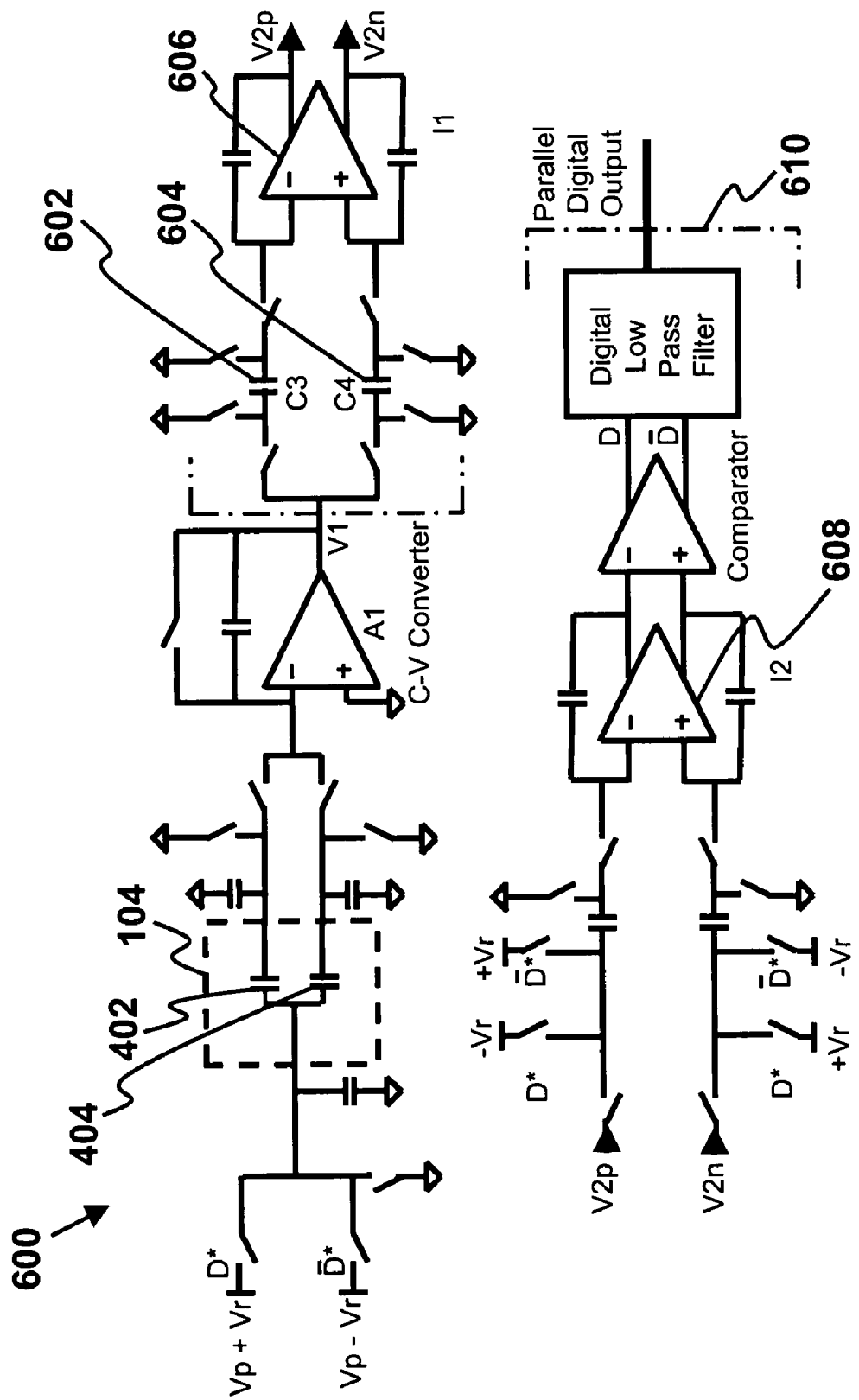

In the circuits of FIG. 4 and FIG. 5, the three terminal MEMS capacitors 104 were connected with the COM node 420 as the input to the circuit, and the other two nodes were driven. In some cases it is desirable to reverse the connection scheme, and use the COM node as the driving node, and the two free terminals as the sense nodes The circuit of FIG. 6 shows a reverse sensor circuit embodiment 600 of the invention that includes operating the sensor circuit with the MEMS sensor 104 reversed. This circuit requires the addition of a double-frequency clocking scheme. The sensor capacitors (402, 404) are sampled at twice the frequency in which the sigma-delta converter 610 operates, where the sigma delta converter is shown within dashed brackets. The clocks Φ3 and Φ4 (not shown) are the double frequency clocks, whereas Φ1 and Φ2 are the base frequency clocks (not shown). During Φ1, sensor capacitor C1 402 is sampled, amplified, and the result is stored on integrator capacitor C3 602. During Φ2, sensor capacitor C2 404 is sampled and amplified, and the result is stored on integrator capacitor C4 604. At the end of Φ2, when both capacitor samples have been stored in the first stage integrator 606 sample-capacitors (602, 604), the integrator 606 processes the data, and passes the result on to the second integrator 608. In this example the sigma delta data converter 610 is shown in a fully differential version. The equations that govern the operation of this circuit are the same as those of the circuit of FIG. 5, yielding the same output function given in Equation 8.

In some cases the structure of the MEMS sensor 104 can be fabricated such that all four connections to the two capacitors (402, 404) are available as isolated leads. This situation affords a more simple method to create the desired capacitance transfer function using a fully differential signal path.

Figure 7:
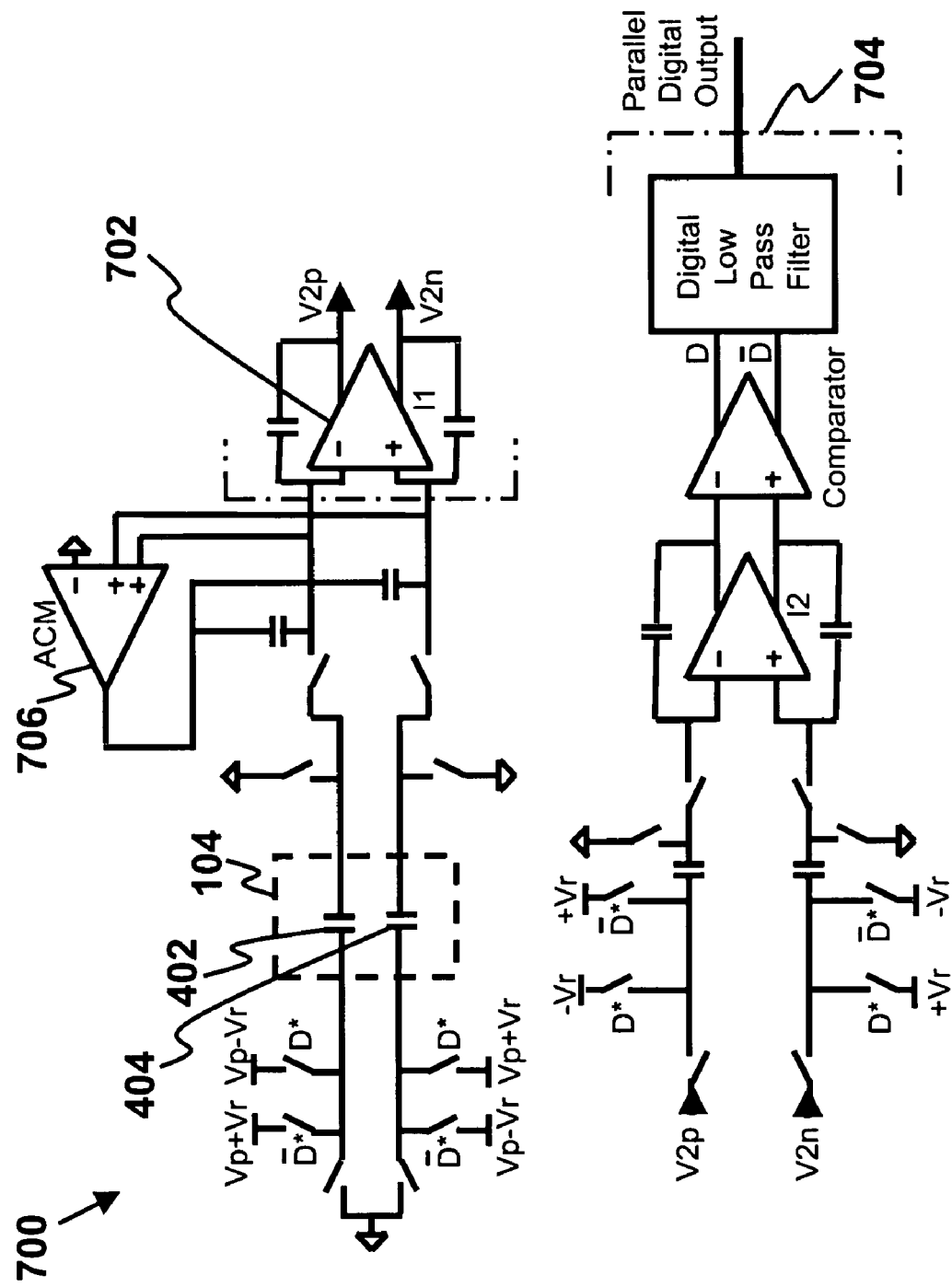

The circuit of FIG. 7 shows a four-lead sensor embodiment 700 of the invention. The four-lead sensor embodiment 700 maintains a fully differential single path, and also provides the desired signal transfer function given in Equation 8. In this embodiment, there is no need for a front-end capacitance to voltage converter. The sensor capacitors (402, 404) can be connected directly to the first stage integrator 702 of the Sigma Delta converter 704 (shown within dashed brackets). It is necessary to add an input common mode correction amplifier 706 to this circuit because the input common mode voltage is not controlled in this configuration. The accuracy of the circuit transfer function is dependant upon the first stage amplifier's input common mode voltage being held at ground.

Figure 8:
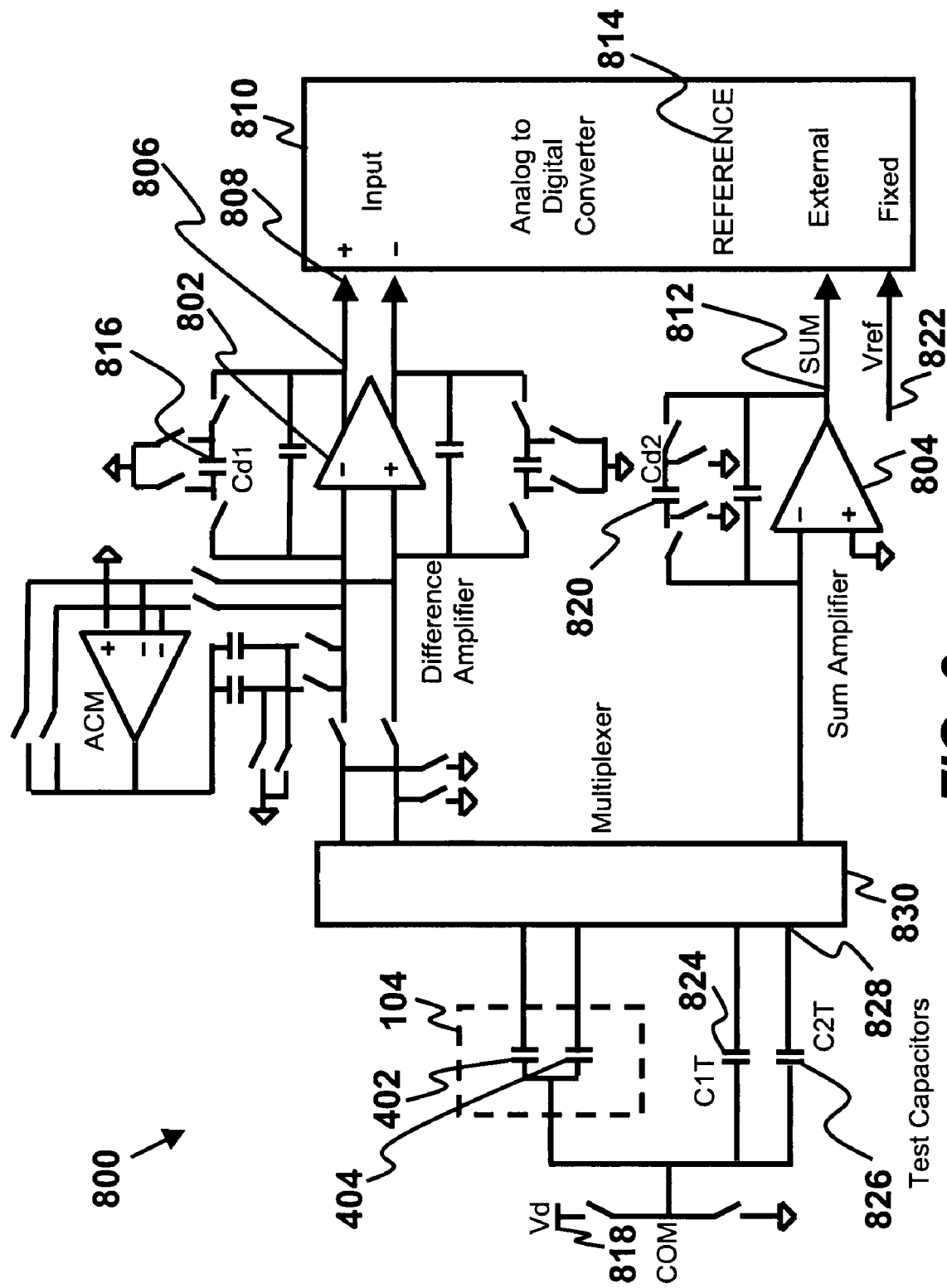

The circuit of FIG. 8 illustrates a further embodiment for obtaining the transfer function of Equation 8, while adding many critical advantages such as transfer function flexibility, lower power consumption without sacrificing resolution, and higher accuracy.

In the previous embodiments, the output function was proportional to the difference between two capacitors (402, 404) divided by their sum. In order for those circuits to calculate the sum and difference, the front-end amplifier or integrator had to process both the differential and common mode capacitance information simultaneously. This requirement results in a compromise of the signal to noise ratio when compared to a differential amplifier that is only required to process the differential capacitance information.

An improved signal to noise ratio embodiment 800 is shown in FIG. 8 according to the current invention. In this circuit, there are two amplifiers that process the sensor capacitance information—a differential amplifier 802, and a sum amplifier 804. These two amplifiers take turns sampling the sense capacitors (402, 404), where when one is active, the output of the other is held constant. The difference amplifier output 806 is applied an input 808 of the Analog to Digital Converter (ADC) 810, and the sum amplifier output 812 is applied to the reference input 814 of the ADC 810. The difference amplifier output 806 is given by:

$$Vout(Diff) = Vd\frac{(C1-C2)}{Cd1} \quad \text{Equation 9}$$

where Cd1 816 is a precision on-chip capacitor, which is typically a poly-poly capacitor, or a MIM (metal-insulator-metal) capacitor, and Vd 818 is the drive voltage, which may be the power supply voltage.

The sum amplifier output 812 is given by:

$$Vout(Sum) = Vd\frac{(C1+C2)}{Cd2} \quad \text{Equation 10}$$

where Cd2 820 is a different capacitor, fabricated in the same manner as Cd1 816.

The ADC 810 produces a digital code that is proportional to the input divided by the reference voltage 822:

$$ADCout \propto \frac{Vin}{Vref} \quad \text{Equation 11}$$

If Equation 9 and Equation 10 are substituted into Equation 11, the ADC output is $$ADCout \propto Vd\frac{(C1-C2)}{Cd1} * \frac{Cd2}{Vd*(C1+C2)} \quad \text{Equation 12}$$
$$\propto G\frac{(C1-C2)}{(C1+C2)}$$

The drive voltage, Vd 818, is canceled. This is valuable because it allows the drive voltage for the sensor 104 to be the power supply voltage (not shown), which may not be very well regulated. This eliminates the need for a precision reference voltage. The gain factor G, is the ratio of Cd2 816 to Cd1 820. The ratio of these two capacitors is well controlled in the integrated circuit manufacturing process, and can be made programmable under software control.

The two amplifiers (802, 804) in FIG. 8 are designed as integrators with switched capacitor feedback. This structure implements a low pass filter (not shown) that takes many samples to settle to its final value. The outputs of these amplifiers (802, 804) are never reset to zero, as required in the previous embodiments. This absence of a reset allows the amplifiers (802, 804) to be designed to optimize noise and power consumption rather than speed. An amplifier that is reset each cycle must be designed with sufficient bandwidth and slew rate to fully settle in one half-clock cycle. A non-resetting low pass integrator only needs sufficient bandwidth to track the change in the input signal. In the current embodiment, the input signal that is measured is the value of a passive component, a capacitor. The bandwidth of this signal is essentially zero (DC), because the mechanical forces acting on the sensor 104 change very slowly. Consequently, the amplifier (802, 804) can be designed to produce the lowest noise and power consumption, at the expense of speed.

The schematic of FIG. 8 shows two capacitors labeled C1T 824 and C2T 826 connected to an input 828 of a multiplexer 830. These are two on-chip test capacitors that can be used to replace C1 402 and C2 404 individually, or together. The value of the test capacitors (824, 826) can be programmed through software control. These two capacitors (824, 826) can be replaced in the Diff cycle, the SUM cycle, or both. This flexibility permits the realization of many different types of circuit transfer functions incorporating the test capacitors (824, 826).

An additional level of flexibility can be achieved by changing the ADC reference input 814 to a fixed reference voltage instead using the SUM signal 810. This also can be programmed under software control.

Figure 9:
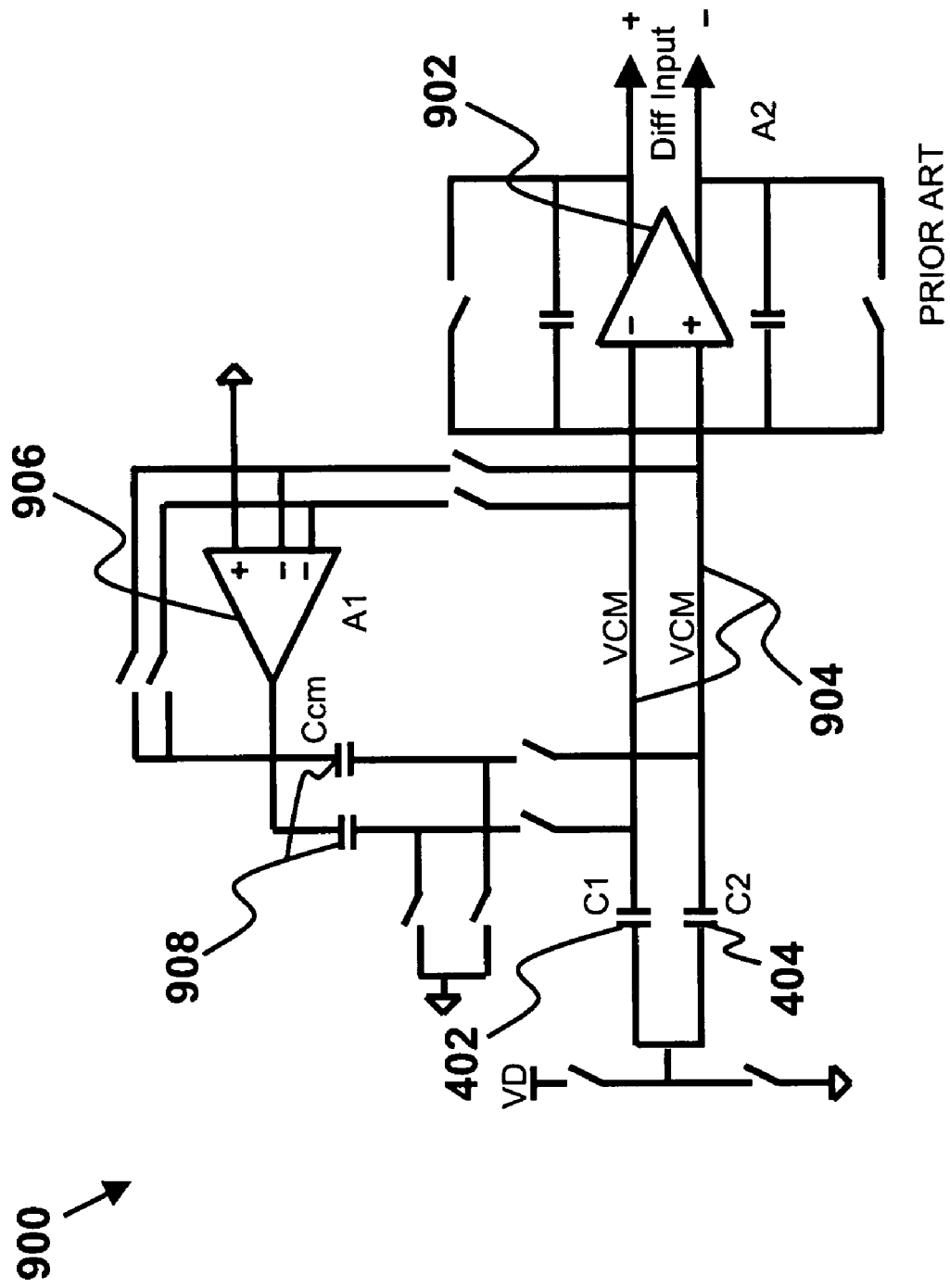
FIG. 9 shows a known circuit for comparison to the present invention.

The circuit of FIG. 9 shows a prior art method 900 for implementing an input common mode correction circuit to provide context to a further aspect of the invention. A2 902 is the differential amplifier that amplifies the difference between C1 402 and C2 404. During the Φ1 reset phase, the voltage VCM 904 will be forced to GND because A2 902 is reset. A1 906 is also reset during Φ1, placing zero volts across the two capacitors Ccm 908. On the Φ2 amplify phase, the voltage VCM 904 will tend to be reduced because of the large negative charge introduced by the MEMS capacitors (402, 404). The amplifier A2 902 sense this negative shift, and corrects it by applying a voltage of opposite sign through the two coupling capacitors Ccm 908. The corrective action of A2 902 restores the voltage VCM 904 to its original value. The coupling capacitors Ccm 908 are required to couple the corrective action of A1 906 into VCM 904, but they have a negative impact on the performance of A2 902. Capacitors Ccm 908 reduce the settling time of A2 902, and also increase its output noise, so it is desirable to reduce the value of Ccm 908. When used in a low-voltage battery powered system (not shown), it is not possible to reduce the value of Ccm 908 beyond a certain limit, because A1 906 will saturate.

Figure 10:
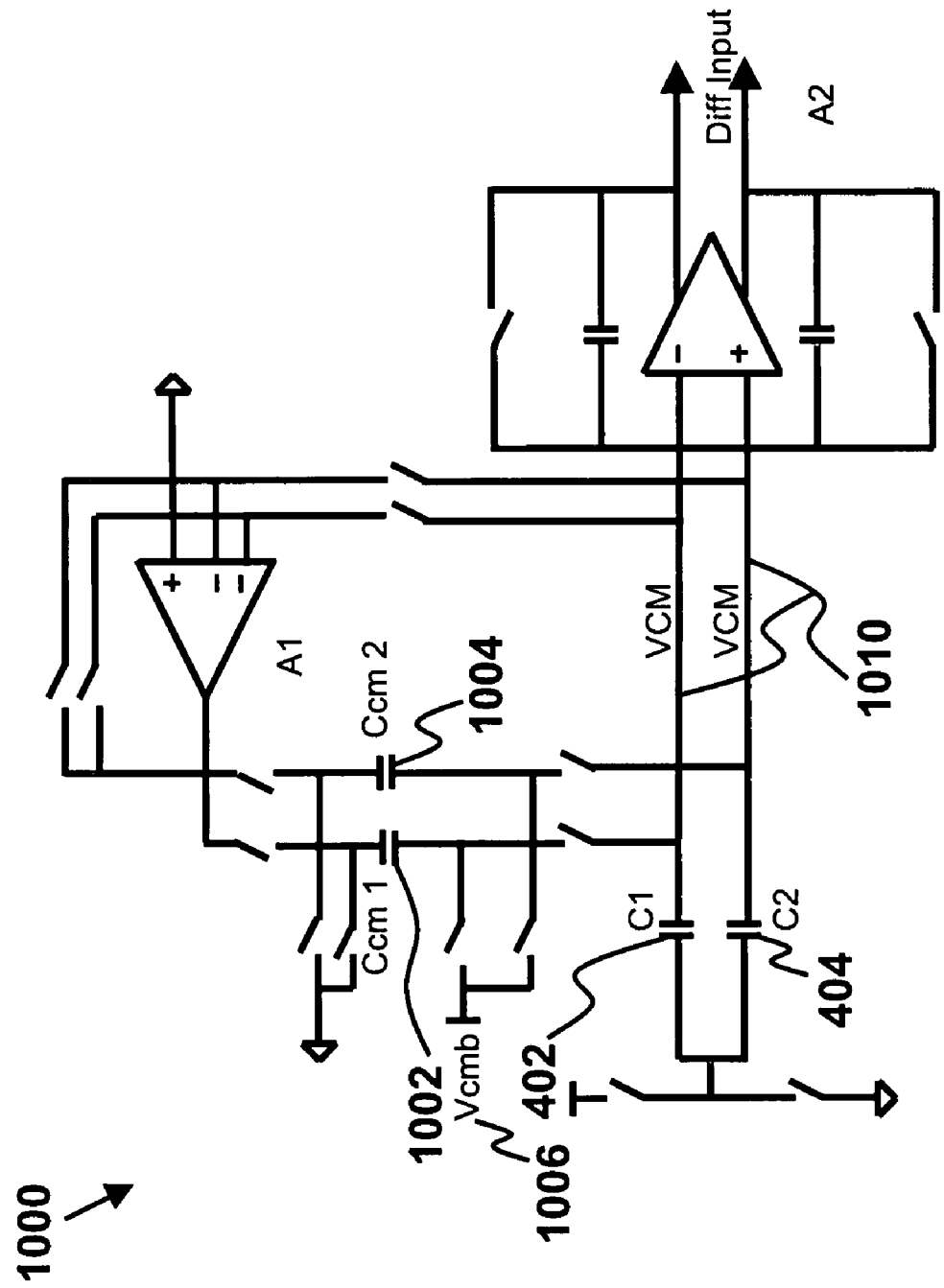
FIG. 10 shows circuits according to the present invention.

The subject of the current embodiment is the control of the voltage VCM 904. An improved common mode correction circuit 1000 is shown in FIG. 10. This circuit permits the use of smaller coupling capacitors Ccm1 1002 and Ccm2 1004, while still preserving the same functionality as in the conventional circuit. During the reset phase, Φ1, the two capacitors Ccm1 1002 and Ccm2 1004 are pre-charged to a value Vcmb 1006. This pre-charge 1006 reduces the required output voltage swing on amplifier A1 1008 when the values of Ccm1 1002 and Ccm2 1004 are reduced.

According to the current embodiment, the two variable capacitors, C1 402 and C2 404, change so slowly compared to the operational frequency of the measurement circuits, they can be assumed to be DC values. Consequently, the input common mode correction voltage 1010 is also a DC signal, and there is no need to recalculate this voltage on every clock cycle. It is possible to slowly arrive at this voltage through many sequential cycles that gradually settle to the required voltage on an integrator, as is further discuss in FIG. 11.

Figure 11:
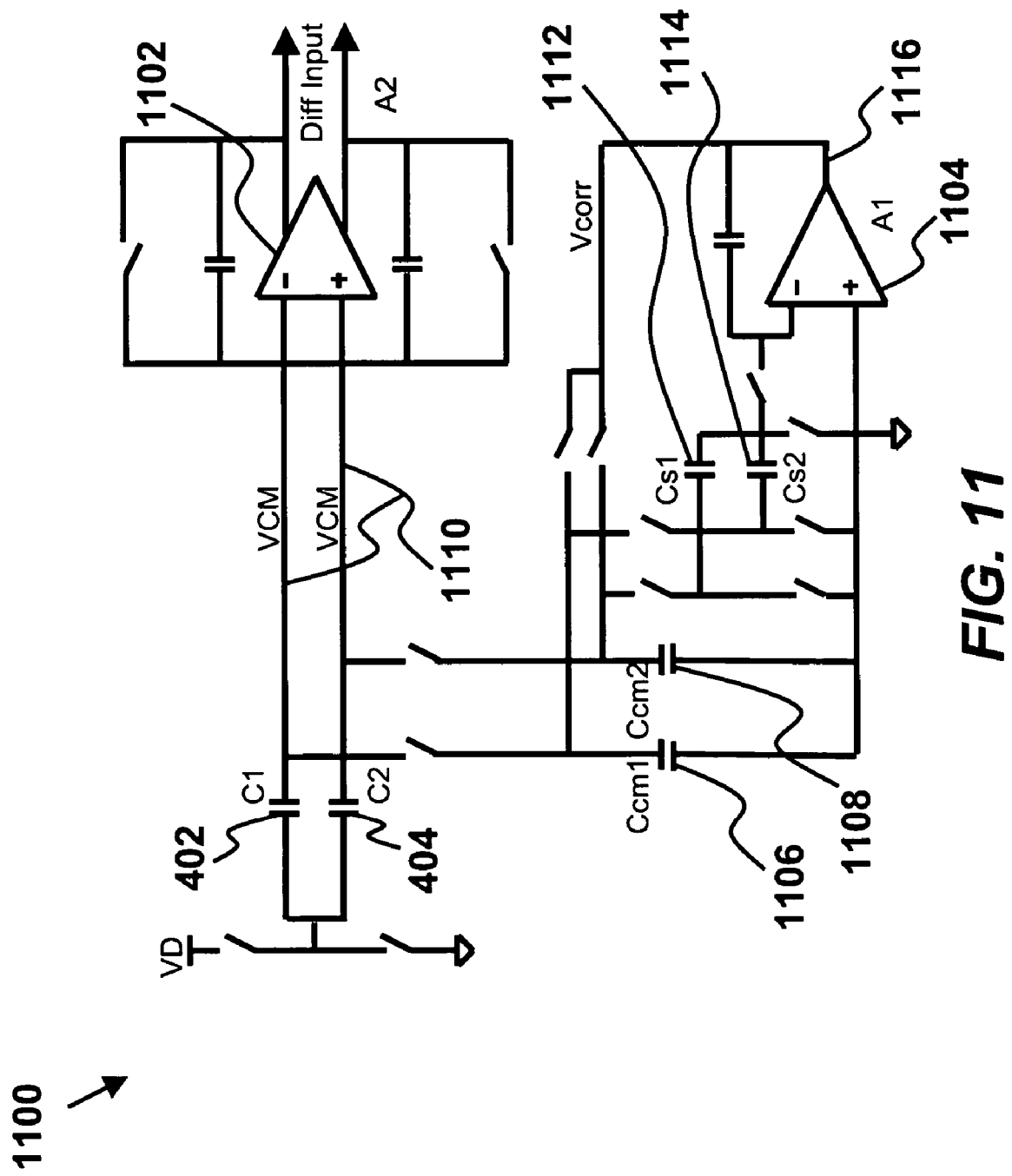
FIG. 11 shows a multi-cycle correction voltage embodiment of the present invention.

According to the multi-cycle correction voltage embodiment 1100 shown in FIG. 11, A2 1102 is the differential amplifier, and A1 1104 is a common mode correction integrator. During Φ1 clock cycle, A2 1102 is reset, and A1 1104 is isolated from A2 1102. The output of integrator A1 1104 is sampled onto the two common mode correction capacitors Ccm1 1106 and Ccm2 1108. During the Φ2 amplify cycle A2 1102 amplifies the difference between C1 402 and C2 404. The voltage that was previously placed on Ccm1 1106 and Ccm2 1108 is applied to the common mode input VCM 1110, and corrects the common mode voltage. This corrected voltage is also sampled onto Cs1 1112 and Cs2 1114. If the correction was perfect, then this voltage will be zero. If not, then these capacitors (1112, 1114) hold the error signal. On the subsequent cycle, the error voltage on Cs1 1112 and Cs2 1114 is integrated on A1 1104, to reduce the error. When the loop has stabilized, the output 1116 of A1 1104 will be exactly the correct voltage that results in zero common mode error on nodes VCM 1110.

The advantage of this design is that A1 1104 no longer has to be reset each cycle, and it can be designed to optimize power consumption and accuracy at the expense of speed. Also, since A1 1104 is not connected to A2 1102 during the amplify cycle, there is no reduction in the settling time of A2 1102 caused by the interaction with A1 1104. A further saving in power can be gained if A2 1102 is replaced by a non-resetting amplifier as in FIG. 8.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed is:

1. A tire pressure monitoring system comprising a switched capacitor circuit, wherein said switched capacitor circuit comprises:
   a. a clock, wherein said clock comprises two non-overlapping clock phases that control a state of analog switches of said switched capacitor circuit, whereas said phases comprise phase I and phase II, whereby said switched capacitor circuit operates at frequencies of said clock;
   b. tire pressure sensor MEMS capacitors, wherein said MEMS capacitors comprise at least one pair of sense capacitors, whereby said sense capacitor pair is measured differentially;
   c. a capacitance-to-voltage converter, wherein said capacitance to voltage converter is connected to said MEMS sense capacitor;
   d. a sigma-delta converter, wherein said sigma-delta converter comprises a comparator having a first digital output state and a second digital output state, wherein said first output state comprises a sum of reference voltages and said second output state comprises a difference of said reference voltages, whereas when in said first output state a first capacitor of said MEMS is charged to said first output state on said phase II and a second capacitor of said MEMS is charged to said second output state on said phase I and when in said second output state said first capacitor is charge to said second output state on said phase II and said second capacitor is charged to said first output state on said phase I, whereby an average of said output states is determined and provided to said capacitance-to-voltage converter, whereas an average value of said capacitance-to-voltage converter output is driven to a zero value and a digital output is provided of said average output states that is equal to a difference between said MEMS capacitors divided by their sum multiplied by a ratio of said reference voltages.

2. The tire pressure monitoring system of claim 1, wherein said MEMS capacitor pair comprises a three-terminal MEMS capacitor pair, whereas a first said terminal is a driven terminal of a first capacitor of said pair and a second said terminal is a driven terminal of a second capacitor of said pair and a third said terminal is common sense terminal node from said pair that is connected to an input of said capacitance-to-voltage converter.

3. The tire pressure monitoring system of claim 1, wherein said MEMS capacitors pair comprises a three-terminal MEMS capacitor pair, whereas a first said terminal is a driven common terminal to said pair and a second terminal is a sense terminal from a first capacitor of said pair and a third said terminal is a sense terminal from a second capacitor of said pair, whereby said sense terminals are connected to an input of said capacitance-to-voltage converter.

4. The tire pressure monitoring system of claim 3, wherein said switched capacitor circuit further comprises double-frequency sampling clocks, whereby said double-frequency clocks sample said sense capacitors at a frequency that is twice an operating frequency of said sigma-delta converter, whereas said sigma-delta converter is a fully differential sigma-delta converter.

5. The tire pressure monitoring system of claim 1, wherein said MEMS capacitors pair comprises a four-terminal MEMS capacitor pair, whereas a first said terminal is a driven terminal of a first capacitor of said pair and a second said terminal is a driven terminal of a second capacitor of said pair and a third said terminal is a sense terminal from said first capacitor of said capacitor pair and a fourth said terminal is a sense terminal from said second capacitor of said capacitor pair, whereby said sense terminals are connected directly to said sigma-delta converter and said capacitance-to-voltage converter is removed from said circuit.

6. The tire pressure monitoring system of claim 5, wherein said switched capacitor circuit further comprises an input common mode correction amplifier connected to said sense terminals and to an input of said sigma-delta converter.

7. A tire pressure monitoring system comprising a switched capacitor circuit, wherein said switched capacitor circuit comprises:
   a. a clock, wherein said clock comprises two non-overlapping clock phases that control a state of analog switches of said switched capacitor circuit, whereas said phases comprise phase I and phase II, whereby said switched capacitor circuit operates at frequencies of said clock;
   b. MEMS capacitors, wherein said MEMS capacitors comprise at least one pair of sense capacitors, whereby said sense capacitor pair is measured differentially;
   c. an analog to digital converter;
   d. a multiplexer comprising a plurality of multiplexer inputs and outputs, wherein a portion of said multiplexer inputs are connected to sense terminals of said MEMS capacitors;
   e. a pair of test capacitors connected in parallel with said MEMS capacitors to said multiplexer inputs;
   f. a difference amplifier wherein inputs of said differential amplifier is connected to outputs of said multiplexer, whereas outputs of said differential amplifier is connected to inputs of said analog to digital converter;
   g. a common mode correction amplifier connected to said multiplexer outputs and said multiplexer outputs are connected to said difference amplifier input; and
   h. a sum amplifier, wherein an input terminal of said sum amplifier is connected to an output of said multiplexer and an output terminal of said sum amplifier is connected to a reference input of said analog to digital converter.

8. The tire pressure monitoring system of claim 7, wherein said common mode correction amplifier further comprises a pre-charge supplied to coupling capacitors of said correction amplifier.

9. The tire pressure monitoring system of claim 7, wherein said common mode correction amplifier is replaced with a common mode correction integrator, whereas said common mode correction integrator comprises a pair of sampling capacitors configured to sample and hold error signals, whereby said error signals are integrated to said common mode integrator on a subsequent clock cycle to reduce said error.

* * * * *